US008780424B2

(12) United States Patent
Yamada

(10) Patent No.: US 8,780,424 B2
(45) Date of Patent: Jul. 15, 2014

(54) IMAGE PROCESSING DEVICE

(75) Inventor: Ryuji Yamada, Ogaki (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 114 days.

(21) Appl. No.: 13/267,343

(22) Filed: Oct. 6, 2011

(65) Prior Publication Data

US 2012/0092734 A1 Apr. 19, 2012

(30) Foreign Application Priority Data

Oct. 13, 2010 (JP) ................................. 2010-230585

(51) Int. Cl.
*G03F 3/08* (2006.01)

(52) U.S. Cl.
USPC .......... 358/518; 358/1.9; 358/3.01; 358/3.23; 358/504; 382/162; 399/27; 399/72; 399/74

(58) Field of Classification Search
CPC combination set(s) only.
See application file for complete search history.

(56) References Cited

U.S. PATENT DOCUMENTS

| 2006/0066882 | A1* | 3/2006 | Yamauchi et al. | 358/1.9 |
| 2009/0141295 | A1* | 6/2009 | Hayashi | 358/1.9 |
| 2011/0141500 | A1* | 6/2011 | Togami | 358/1.9 |

FOREIGN PATENT DOCUMENTS

| JP | 2001-296704 A | 10/2001 |
| JP | 2006-138916 A | 6/2006 |
| JP | 2006-259145 A | 9/2006 |
| JP | 2006-284793 A | 10/2006 |

* cited by examiner

*Primary Examiner* — Houshang Safaipour
*Assistant Examiner* — Idowu O Osifade
(74) *Attorney, Agent, or Firm* — Scully, Scott, Murphy & Presser, PC

(57) ABSTRACT

In the image processing device, the color conversion part converts the input value to an output value by using a color profile. The correction part corrects the output value to a corrected value by using a correction table. The update part updates the correction table based on a density patch. The first and second amount is an estimated amount of the color material to be consumed when corrected image data corrected by either using the updated correction table or using an initial correction table, respectively, is printed. When the amount determining part determines that the first amount is greater than the second amount, the modifying part modifies the color profile such that the output value in the modified color profile specifies a less amount of color material than an amount of color material specified by the output value in the unmodified color profile.

8 Claims, 11 Drawing Sheets

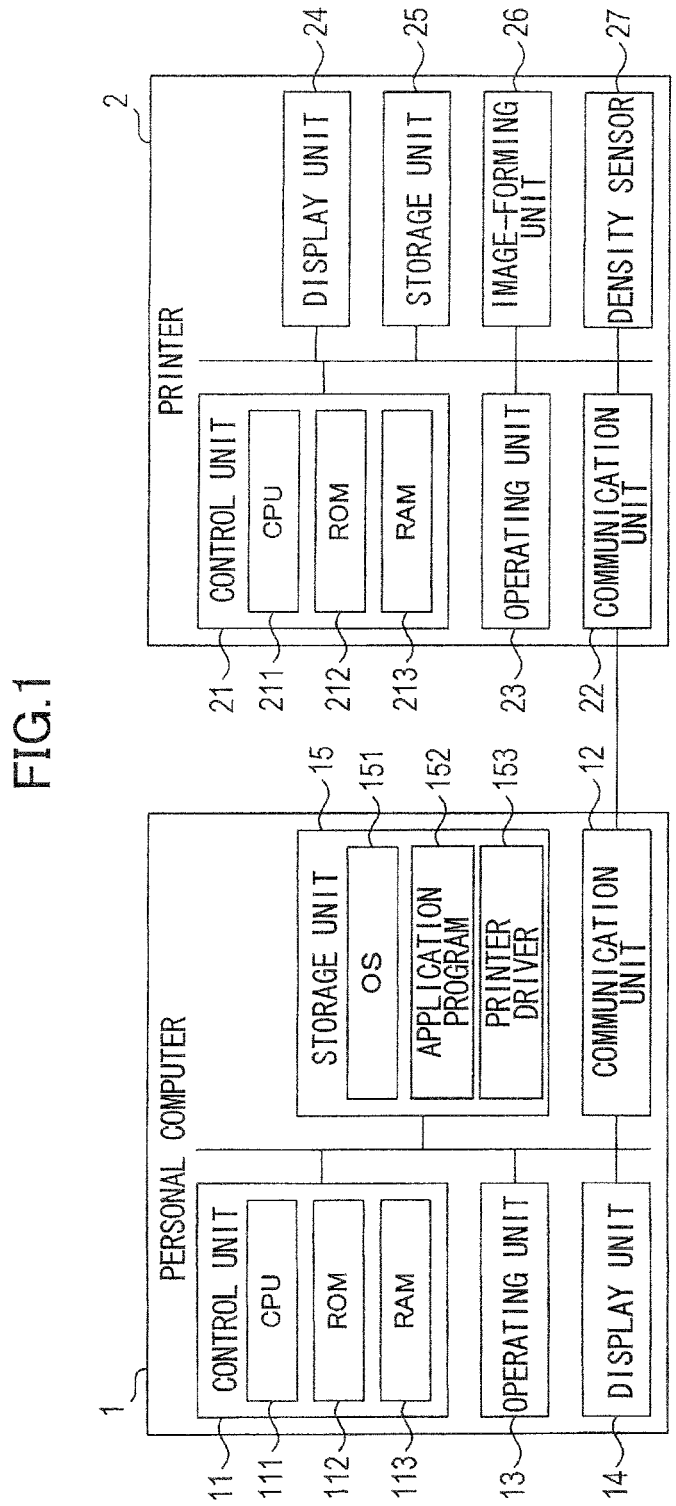

FIG.3(a)
INPUT VALUES

FIG.3(b)
OUTPUT VALUES BEFPRE COLOR VALUES ARE MODIFIED

FIG.3(c)
CORRECTED OUTPUT VALUES BY DEFAULT CORRECTION TABLE BEFORE COLOR VALUES ARE MODIFIED

FIG.3(d)
CORRECTED OUTPUT VALUES BY UPDATED CORRECTION TABLE BEFORE COLOR VALUES ARE MODIFIED

| R | G | B | | C | M | Y | K | | C' | M' | Y' | K' | | C' | M' | Y' | K' |
|---|---|---|---|---|---|---|---|---|----|----|----|----|---|----|----|----|----|
| 255 | 255 | 255 | | 0 | 0 | 0 | 0 | | 0 | 0 | 0 | 0 | | 0 | 0 | 0 | 0 |
| 240 | 240 | 255 | | 15 | 5 | 0 | 0 | | 17 | 7 | 0 | 0 | | 19 | 9 | 0 | 0 |
| 224 | 224 | 255 | | 29 | 11 | 0 | 0 | | 31 | 13 | 0 | 0 | | 33 | 15 | 0 | 0 |
| 208 | 208 | 255 | | 44 | 16 | 0 | 0 | | 46 | 18 | 0 | 0 | | 48 | 20 | 0 | 0 |
| 192 | 192 | 255 | | 58 | 21 | 0 | 0 | | 60 | 23 | 0 | 0 | | 62 | 25 | 0 | 0 |
| 176 | 176 | 255 | | 73 | 26 | 0 | 0 | | 75 | 28 | 0 | 0 | | 77 | 30 | 0 | 0 |
| 160 | 160 | 255 | | 87 | 32 | 0 | 0 | | 89 | 34 | 0 | 0 | | 91 | 36 | 0 | 0 |
| 144 | 144 | 255 | | 102 | 37 | 0 | 0 | | 104 | 39 | 0 | 0 | | 106 | 41 | 0 | 0 |
| 128 | 128 | 255 | | 117 | 42 | 0 | 0 | | 119 | 44 | 0 | 0 | | 121 | 46 | 0 | 0 |
| 112 | 112 | 255 | | 132 | 47 | 0 | 0 | | 134 | 49 | 0 | 0 | | 136 | 51 | 0 | 0 |
| 96 | 96 | 255 | | 147 | 52 | 0 | 0 | | 149 | 54 | 0 | 0 | | 151 | 56 | 0 | 0 |
| 80 | 80 | 255 | | 162 | 57 | 0 | 0 | | 164 | 59 | 0 | 0 | | 166 | 61 | 0 | 0 |
| 64 | 64 | 255 | | 177 | 62 | 0 | 0 | | 179 | 64 | 0 | 0 | | 181 | 66 | 0 | 0 |
| 48 | 48 | 255 | | 192 | 67 | 0 | 0 | | 194 | 69 | 0 | 0 | | 196 | 71 | 0 | 0 |
| 32 | 32 | 255 | | 207 | 73 | 0 | 0 | | 209 | 75 | 0 | 0 | | 211 | 77 | 0 | 0 |
| 16 | 16 | 255 | | 222 | 78 | 0 | 0 | | 224 | 80 | 0 | 0 | | 226 | 82 | 0 | 0 |
| 0 | 0 | 255 | | 237 | 83 | 0 | 0 | | 239 | 85 | 0 | 0 | | 241 | 87 | 0 | 0 |
| 0 | 0 | 240 | | 243 | 88 | 6 | 0 | | 245 | 90 | 8 | 0 | | 247 | 92 | 10 | 0 |
| 0 | 0 | 224 | | 249 | 93 | 13 | 0 | | 251 | 95 | 15 | 0 | | 253 | 97 | 17 | 0 |
| 0 | 0 | 208 | | 251 | 98 | 19 | 0 | | 253 | 100 | 21 | 0 | | 255 | 102 | 23 | 0 |
| 0 | 0 | 192 | | 251 | 101 | 26 | 0 | | 253 | 103 | 28 | 0 | | 255 | 105 | 30 | 0 |
| 0 | 0 | 176 | | 251 | 105 | 29 | 0 | | 253 | 107 | 31 | 0 | | 255 | 109 | 33 | 0 |
| 0 | 0 | 160 | | 251 | 108 | 33 | 5 | | 253 | 110 | 35 | 7 | | 255 | 112 | 37 | 9 |
| 0 | 0 | 144 | | 251 | 112 | 36 | 15 | | 253 | 114 | 38 | 17 | | 255 | 116 | 40 | 19 |
| 0 | 0 | 128 | | 251 | 115 | 39 | 24 | | 253 | 117 | 41 | 26 | | 255 | 119 | 43 | 28 |
| 0 | 0 | 112 | | 251 | 119 | 43 | 35 | | 253 | 121 | 45 | 37 | | 255 | 123 | 47 | 39 |
| 0 | 0 | 96 | | 250 | 117 | 39 | 48 | | 252 | 119 | 41 | 50 | | 254 | 121 | 43 | 52 |
| 0 | 0 | 80 | | 243 | 115 | 36 | 65 | | 245 | 117 | 38 | 67 | | 247 | 119 | 40 | 69 |
| 0 | 0 | 64 | | 231 | 105 | 32 | 92 | | 233 | 107 | 34 | 94 | | 235 | 109 | 36 | 96 |
| 0 | 0 | 48 | | 214 | 95 | 27 | 126 | | 216 | 97 | 29 | 128 | | 218 | 99 | 31 | 130 |
| 0 | 0 | 32 | | 192 | 68 | 14 | 171 | | 194 | 70 | 16 | 173 | | 196 | 72 | 18 | 175 |
| 0 | 0 | 16 | | 152 | 42 | 0 | 222 | | 154 | 44 | 0 | 224 | | 156 | 46 | 0 | 226 |
| 0 | 0 | 0 | | 100 | 15 | 0 | 251 | | 102 | 17 | 0 | 253 | | 104 | 19 | 0 | 255 |

FIG.3(e)
DIFFERENCES OBTAINED BY SUBTRACTING VALUES IN FIG.3(c) FROM VALUES IN FIG.3(d)

| C | M | Y | K |
|---|---|---|---|
| 0 | 0 | 0 | 0 |
| 2 | 2 | 0 | 0 |
| 2 | 2 | 0 | 0 |
| 2 | 2 | 0 | 0 |
| 2 | 2 | 0 | 0 |
| 2 | 2 | 0 | 0 |
| 2 | 2 | 0 | 0 |
| 2 | 2 | 0 | 0 |
| 2 | 2 | 0 | 0 |
| 2 | 2 | 0 | 0 |
| 2 | 2 | 0 | 0 |
| 2 | 2 | 0 | 0 |
| 2 | 2 | 0 | 0 |
| 2 | 2 | 0 | 0 |
| 2 | 2 | 0 | 0 |
| 2 | 2 | 0 | 0 |
| 2 | 2 | 0 | 0 |
| 2 | 2 | 2 | 0 |
| 2 | 2 | 2 | 0 |
| 2 | 2 | 2 | 0 |
| 2 | 2 | 2 | 0 |
| 2 | 2 | 2 | 0 |
| 2 | 2 | 2 | 2 |
| 2 | 2 | 2 | 2 |
| 2 | 2 | 2 | 2 |
| 2 | 2 | 2 | 2 |
| 2 | 2 | 2 | 2 |
| 2 | 2 | 2 | 2 |
| 2 | 2 | 2 | 2 |
| 2 | 2 | 2 | 2 |
| 2 | 2 | 2 | 2 |
| 2 | 2 | 0 | 2 |
| 2 | 2 | 0 | 2 |

TOTAL 64 64 28 22

FIG.3(f)
OUTPUT VALUES OF MODIFIED COLOR PROFILE

LIGHT REGION → INTERMEDIATE REGION → DARK REGION

| C | M | Y | K |
|---|---|---|---|
| 0 | 0 | 0 | 0 |
| 15 | 5 | 0 | 0 |
| 29 | 11 | 0 | 0 |
| 44 | 16 | 0 | 0 |
| 58 | 21 | 0 | 0 |
| 73 | 26 | 0 | 0 |
| 87 | 32 | 0 | 0 |
| 102 | 37 | 0 | 0 |
| 117 | 42 | 0 | 0 |
| 132 | 47 | 0 | 0 |
| 147 | 52 | 0 | 0 |
| 162 | 57 | 0 | 0 |
| 177 | 62 | 0 | 0 |
| 192 | 67 | 0 | 0 |
| 207 | 73 | 0 | 0 |
| 222 | 78 | 0 | 0 |
| 237 | 83 | 0 | 0 |
| 239 | 84 | 4 | 0 |
| 245 | 89 | 11 | 0 |
| 247 | 94 | 17 | 0 |
| 247 | 97 | 24 | 0 |
| 247 | 101 | 27 | 0 |
| 247 | 104 | 31 | 3 |
| 247 | 108 | 34 | 13 |
| 247 | 111 | 37 | 22 |
| 247 | 115 | 41 | 33 |
| 246 | 113 | 37 | 46 |
| 239 | 111 | 34 | 63 |
| 227 | 101 | 30 | 90 |
| 210 | 91 | 25 | 124 |
| 188 | 64 | 12 | 169 |
| 148 | 38 | 0 | 220 |
| 96 | 11 | 0 | 249 |

FIG.3(g)
CORRECTED OUTPUT VALUES BY UPDATED CORRECTION TABLE AFTER COLOR PROFILE IS MODIFIED

| C' | M' | Y' | K' |
|---|---|---|---|
| 0 | 0 | 0 | 0 |
| 19 | 9 | 0 | 0 |
| 33 | 15 | 0 | 0 |
| 48 | 20 | 0 | 0 |
| 62 | 25 | 0 | 0 |
| 77 | 30 | 0 | 0 |
| 91 | 36 | 0 | 0 |
| 106 | 41 | 0 | 0 |
| 121 | 46 | 0 | 0 |
| 136 | 51 | 0 | 0 |
| 151 | 56 | 0 | 0 |
| 166 | 61 | 0 | 0 |
| 181 | 66 | 0 | 0 |
| 196 | 71 | 0 | 0 |
| 211 | 77 | 0 | 0 |
| 226 | 82 | 0 | 0 |
| 241 | 87 | 0 | 0 |
| 243 | 88 | 8 | 0 |
| 249 | 93 | 15 | 0 |
| 251 | 98 | 21 | 0 |
| 251 | 101 | 28 | 0 |
| 251 | 105 | 31 | 0 |
| 251 | 108 | 35 | 7 |
| 251 | 112 | 38 | 17 |
| 251 | 115 | 41 | 26 |
| 251 | 119 | 45 | 37 |
| 250 | 117 | 41 | 50 |
| 243 | 115 | 38 | 67 |
| 231 | 105 | 34 | 94 |
| 214 | 95 | 29 | 128 |
| 192 | 68 | 16 | 173 |
| 152 | 42 | 0 | 224 |
| 100 | 15 | 0 | 253 |

FIG.3(h)
DIFFERENCES OBTAINED BY SUBTRACTING VALUES IN FIG.3(c) FROM VALUES IN FIG.3(g)

| C | M | Y | K |
|---|---|---|---|
| 0 | 0 | 0 | 0 |
| 2 | 2 | 0 | 0 |
| 2 | 2 | 0 | 0 |
| 2 | 2 | 0 | 0 |
| 2 | 2 | 0 | 0 |
| 2 | 2 | 0 | 0 |
| 2 | 2 | 0 | 0 |
| 2 | 2 | 0 | 0 |
| 2 | 2 | 0 | 0 |
| 2 | 2 | 0 | 0 |
| 2 | 2 | 0 | 0 |
| 2 | 2 | 0 | 0 |
| 2 | 2 | 0 | 0 |
| 2 | 2 | 0 | 0 |
| 2 | 2 | 0 | 0 |
| 2 | 2 | 0 | 0 |
| 2 | 2 | 0 | 0 |
| -2 | -2 | 0 | 0 |
| -2 | -2 | 0 | 0 |
| -2 | -2 | 0 | 0 |
| -2 | -2 | 0 | 0 |
| -2 | -2 | 0 | 0 |
| -2 | -2 | 0 | 0 |
| -2 | -2 | 0 | 0 |
| -2 | -2 | 0 | 0 |
| -2 | -2 | 0 | 0 |
| -2 | -2 | 0 | 0 |
| -2 | -2 | 0 | 0 |
| -2 | -2 | 0 | 0 |
| -2 | -2 | 0 | 0 |
| -2 | -2 | 0 | 0 |
| -2 | -2 | 0 | 0 |
| -2 | -2 | 0 | 0 |

TOTAL 0 0 0 0

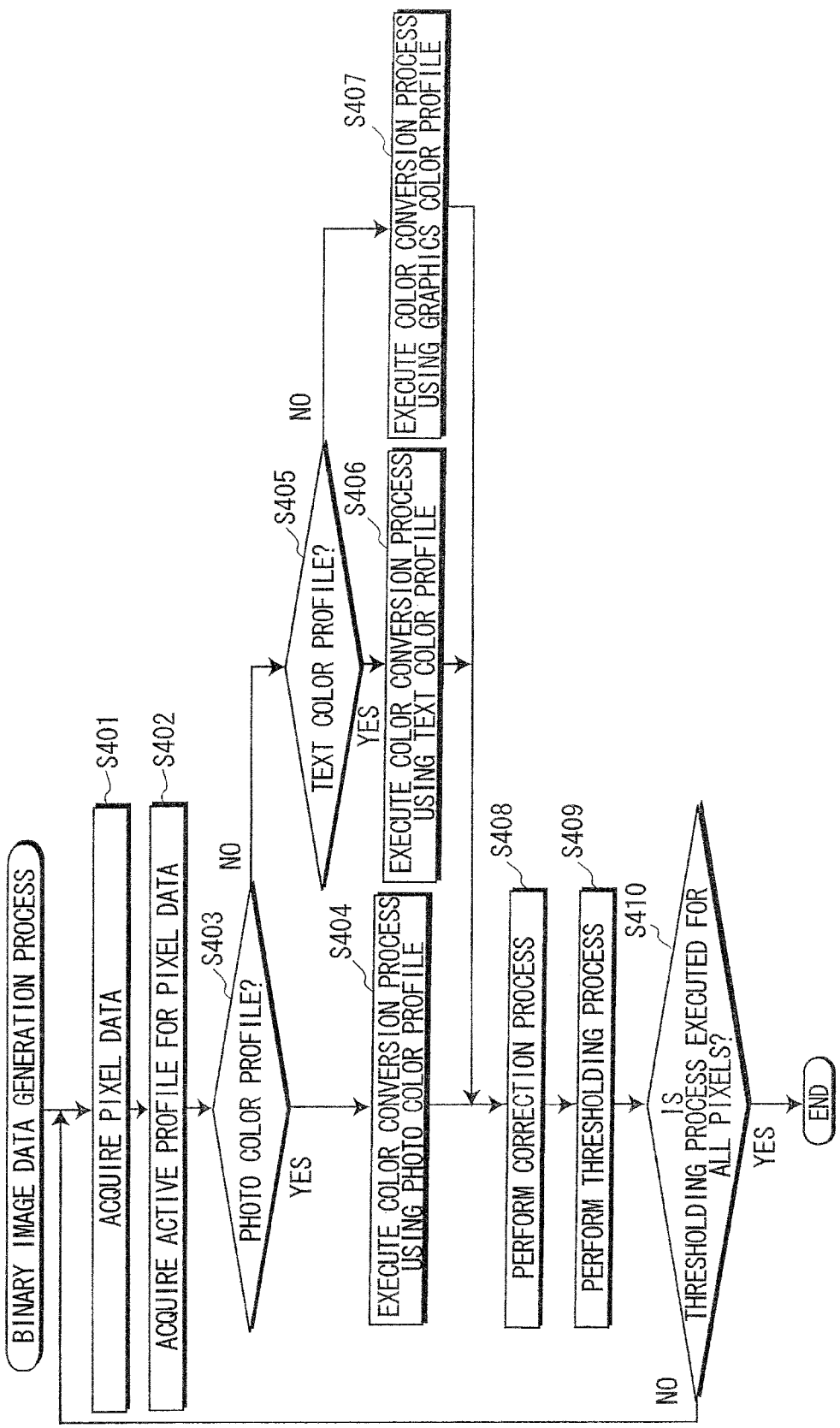

IMAGE PROCESSING DEVICE

CROSS REFERENCE TO RELATED APPLICATION

This application claims priority from Japanese Patent Application No. 2010-230585 filed Oct. 13, 2010. The entire content of the priority application is incorporated herein by reference.

TECHNICAL FIELD

The invention relates to an image processor provided with correcting means for correcting image data based on a correction table.

BACKGROUND

Many conventional printing devices for printing images on paper or other printing media using colorants, such as toner or ink, execute a calibration process for maintaining uniform printing densities, and color balance. In the calibration process, the printing device forms density patches at a plurality of density levels with the colorant used for printing, measures the densities of these patches, and updates a correction table for correcting image data based on the measured densities. By executing this calibration process at appropriate times for updating the correction table and correcting image data based on the updated correction table, the printing device can maintain consistent quality in printed images, even when the performance of the printing device changes over time.

One such conventional printing device that performs this calibration process is configured to restrain toner consumption when the device is getting low on toner by either lengthening the interval between scheduled calibration processes or skipping the process entirely.

SUMMARY

Normally, printing devices that print images with colorant are designed to estimate the number of pages that can be printed with the amount of unused colorant remaining Naturally, it is desirable that this estimated number of printable pages does not differ greatly from the actual number of printable pages. It is particularly desirable that the actual number of printable pages be not greatly less than the estimated number of printable pages.

The estimated number of printable pages is determined by estimating the quantity of colorant used for printing one sheet of the printing media. However, this estimated quantity is determined based on a default correction table created before the calibration process is executed. If the quantity of colorant used for printing one sheet of the printing media increases in the correction table when the table is updated through the calibration process, there is a high likelihood that the printing device will run out of colorant before the actual number of printable pages reaches the estimated number of printable pages.

In addition, since this conventional printing device restricts execution of the calibration process when the amount of residual toner is low, aspects of printing quality such as printing density and color balance worsen. Moreover, since this conventional printing device does not account for the originally predicted number of printable pages, the device restricts execution of the calibration process when the quantity of toner runs low, even when the actual number of printable pages is greater than the estimated number.

In view of the foregoing, it is an object of the invention to provide an art capable of preventing the problem of colorant running out before the actual number of printable pages reaches the estimated number of printable pages.

In order to attain the above and other objects, the invention provides an image processing device includes a processing unit and a memory. The memory has instructions stored thereon that, when executed by the processing unit, cause the processing unit to function as an acquiring part, a color conversion part, a correction part, an update part, an amount determining part, and a modifying part. The acquiring part acquires image data indicating an image and having an input value. The image data is printed by using at least one color material. The color conversion part converts the input value to an output value by using a color profile that correlates the input value to the output value. The output value specifies an amount of a color material of the at least one color material. The correction part corrects the output value to a corrected value by using a correction table that correlates the output value to the corrected value. The update part updates the correction table based on a density patch formed by using the at least one color material. The amount determining part determines for each color material of the at least one color material whether a first amount is greater than a second amount. The first amount is an estimated amount of the each color material to be consumed when corrected image data corrected by using the updated correction table is printed. The second amount is an estimated amount of the each color material to be consumed when corrected image data corrected by using an initial correction table that is not updated is printed. When the amount determining part determines that the first amount is greater than the second amount for one color material of the at least one color material, the modifying part modifies the color profile such that the output value in the modified color profile specifies a less amount of color material corresponding to the one color material than an amount of color material specified by the output value in the unmodified color profile corresponding to the one color material.

According to another aspect, the invention provides a non-transitory computer readable storage medium storing a set of program instructions installed on and executed by a computer. The program instructions includes acquiring image data indicating an image and having an input value where the image data is printed by using at least one color material, converting the input value to an output value by using a color profile that correlates the input value to the output value where the output value specifies an amount of a color material of the at least one color material, correcting the output value to a corrected value by using a correction table that correlates the output value to the corrected value, updating the correction table based on a density patch formed by using the at least one color material, determining for each color material of the at least one color material whether a first amount is greater than a second amount where the first amount is an estimated amount of the each color material to be consumed when corrected image data corrected by using the updated correction table is printed, and where the second amount is an estimated amount of the each color material to be consumed when corrected image data corrected by using an initial correction table that is not updated is printed, modifying the color profile, when the determining determines that the first amount is greater than the second amount for one color material of the at least one color material, such that the output value in the modified color profile specifies a less amount of color material corresponding to the one color material than an amount of color material specified by the output value in the unmodified color profile corresponding to the one color material.

BRIEF DESCRIPTION OF THE DRAWINGS

The particular features and advantages of the invention as well as other objects will become apparent from the following description taken in connection with the accompanying drawings, in which:

FIG. 1 is a block diagram showing a general structure of a printing system according to a first embodiment;

FIG. 3(a) is an explanatory diagram illustrating input values in a color profile;

FIG. 3(b) is an explanatory diagram illustrating output values in the color profile corresponding to input values shown in FIG. 3(a) before the color profile is modified;

FIG. 3(c) is an explanatory diagram illustrating corrected values obtained by correcting output values shown in FIG. 3(b) according to a default correction table;

FIG. 3(d) is an explanatory diagram illustrating corrected values obtained by correcting output values shown in FIG. 3(b) according to an updated correction table;

FIG. 3(e) is an explanatory diagram illustrating differences obtained by subtracting values in FIG. 3(c) form values in FIG. 3(d);

FIG. 3(f) is an explanatory diagram illustrating output values in a modified color profile corresponding to input values shown in FIG. 3(a);

FIG. 3(g) is an explanatory diagram illustrating corrected values obtained by correcting output values shown in FIG. 3(f) according to the updated correction table;

FIG. 3(h) is an explanatory diagram illustrating differences obtained by subtracting values in FIG. 3(c) from values in FIG. 3(g);

FIG. 8 is a flowchart illustrating the binary image data generation process according to the first embodiment;

DETAILED DESCRIPTION

Figure 2A:
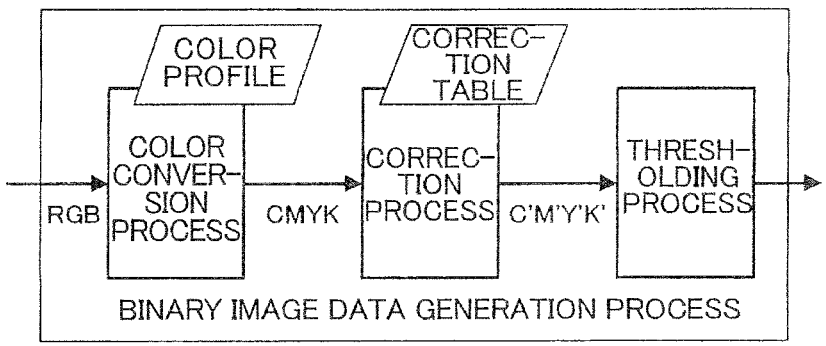
FIG. 2(a) is an explanatory diagram illustrating a binary image data generation process according to the first embodiment.

1. First Embodiment 1-1. Overall Structure of a Printing System

FIG. 1 is a block diagram showing the general structure of a printing system configured of a personal computer 1 and a printer 2 that are capable of communicating with each other.

The personal computer 1 is a general-purpose data processor and includes a control unit 11, a communication unit 12, an operating unit 13, a display unit 14, and a storage unit 15.

The control unit 11 performs overall control of the components in the personal computer 1. The control unit 11 includes a CPU 111, a ROM 112, and a RAM 113.

The communication unit 12 is an interface enabling the personal computer 1 to communicate and exchange data with the printer 2.

The operating unit 13 is an input device enabling the user to input commands through external operations. In the embodiment, the operating unit 13 includes a keyboard and pointing device, such as a mouse or touchpad.

The display unit 14 is an output device for displaying various information to the user as images that the user can interpret. In the embodiment, the display unit 14 is configured of a liquid crystal display.

The storage unit 15 is a nonvolatile storage device storing data that can be overwritten. In the embodiment, the storage unit 15 is configured of a hard disk drive. Various software programs are installed on the storage unit 15, including an operating system (OS) 151, an application program 152 such as a graphics tool, and a printer driver 153 that enables the personal computer 1 to use the printer 2.

The printer 2 is an electrophotographic printing device and includes a control unit 21, a communication unit 22, an operating unit 23, a display unit 24, a storage unit 25, an image-forming unit 26, and a density sensor 27.

The control unit 21 performs overall control of the components in the printer 2. The control unit 21 includes a CPU 211, a ROM 212, and a RAM 213.

The communication unit 22 is an interface that enables the printer 2 to communicate and exchange data with the personal computer 1.

The operating unit 23 is an input device enabling the user to input commands through external operations. The operating unit 23 includes various operating buttons.

The display unit 24 is an output device for displaying various information to the user as images that the user can interpret. The display unit 24 includes a small liquid crystal display.

The storage unit 25 is a nonvolatile storage device for storing data that can be overwritten. In the embodiment, the storage unit 25 is configured of flash memory.

The image-forming unit 26 is a component for forming images expressed in binary image data as visible images according to an electrophotographic method that uses toner in the four colors cyan (C), magenta (M), yellow (Y), and black (K). The image-forming unit 26 includes four photosensitive members corresponding to the four toner colors. During image formation in the image-forming unit 26, chargers apply an electric charge to the surfaces of the photosensitive members, and exposure devices such as LED heads irradiate light onto the charged surfaces of the photosensitive members to form electrostatic latent images thereon based on binary image data for each of the CMYK colors that altogether represent a color image. The electrostatic latent images formed on the photosensitive members are developed into visible toner images by toner in the CMYK colors supplied from developing devices. The toner images in each of the CMYK colors are transferred onto a sheet of paper or other recording medium conveyed by a conveying belt so as to be superposed on each other. Subsequently, the toner images are fixed to the printing medium by heat in a fixing unit, thereby completing the process of printing an image on the printing medium. The components used for this printing process are well known in the art and, therefore, have been omitted from the drawings.

When a calibration process described later is executed, the image-forming unit 26 also forms density patches directly on the conveying belt with the toner used for printing. The density patches represent a plurality of density levels for each of the CMYK colors. The image-forming unit 26 is also provided with a cleaning member for recovering the density patches formed on the conveying belt after the calibration process.

The density sensor 27 is used for measuring the densities of the density patches formed by the image-forming unit 26 on the conveying belt.

The CPU 21 estimates the number of sheets that can be printed with the amount of unused toner based on the predetermined quantity of toner for printing one sheet printed by using the default correction table.

1-2. Process Overview

Next, an overview of processes executed on the above printing system will be described.

The printer driver 153 is started when the user of the personal computer 1 initiates a print operation in the application program 152 while the application program 152 is executing. As a process of the application program 152, the printer driver 153 passes image data representing an image to be printed to the control unit 11 of the personal computer 1, and the control unit 11 converts the image data to binary image data for the CMYK colors so that the data can be rendered on the printer 2, and transfers the converted binary image data to the printer 2. Here, the image data represents the image and specifies the pixel values. The image data passed from the application program 152 is configured of draw commands. These draw commands can be classified as bitmap draw commands for drawing photo objects (hereinafter referred to as "photo draw commands"), text draw commands for drawing text objects, and graphics draw commands for drawing graphics objects.

Figure 2B:
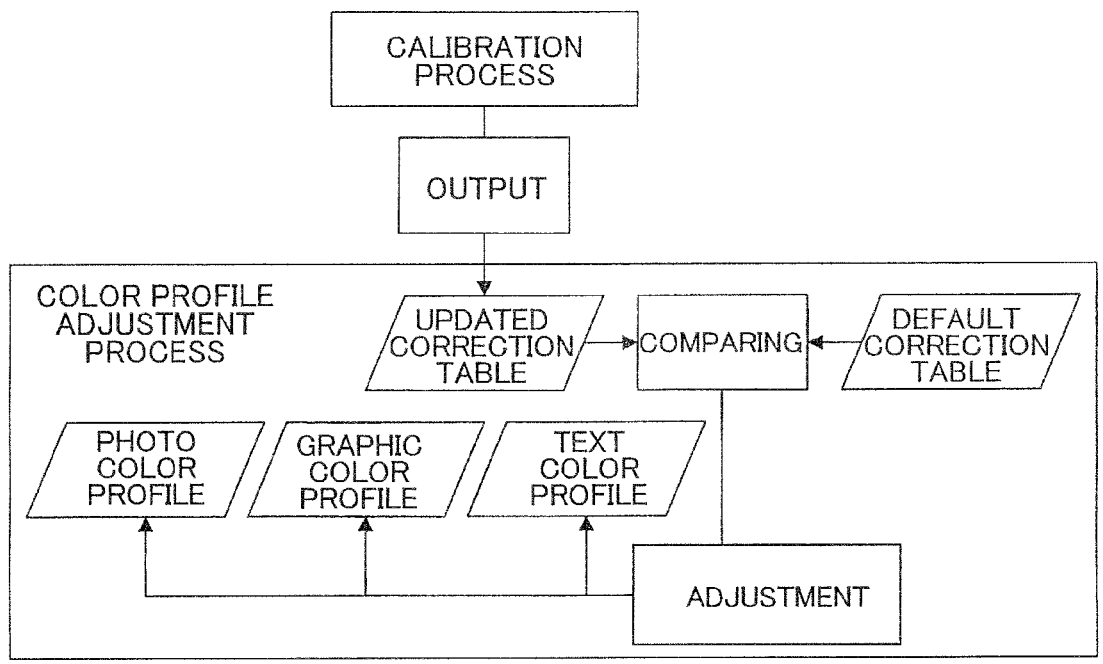
FIG. 2(b) is an explanatory diagram illustrating a calibration process and a color profile adjustment process according to the first embodiment.

Therefore, in the personal computer 1 according to the embodiment, the control unit 11 first develops the image data configured of draw commands into image data expressed in 256-level RGB values. Next, as indicated in FIG. 2(*a*), the control unit 11 performs a color conversion process on the RGB image data for converting this image data into data expressed in CMYK values based on a color profile that specifies correlations between the input color values (RGB values) and the output color values (CMYK values). Note that the color profile according to the embodiment refers to a device link profile linking the device profile of the display unit 14 (an ICC profile) to the device profile of the printer 2 (an ICC profile).

Figure 4:
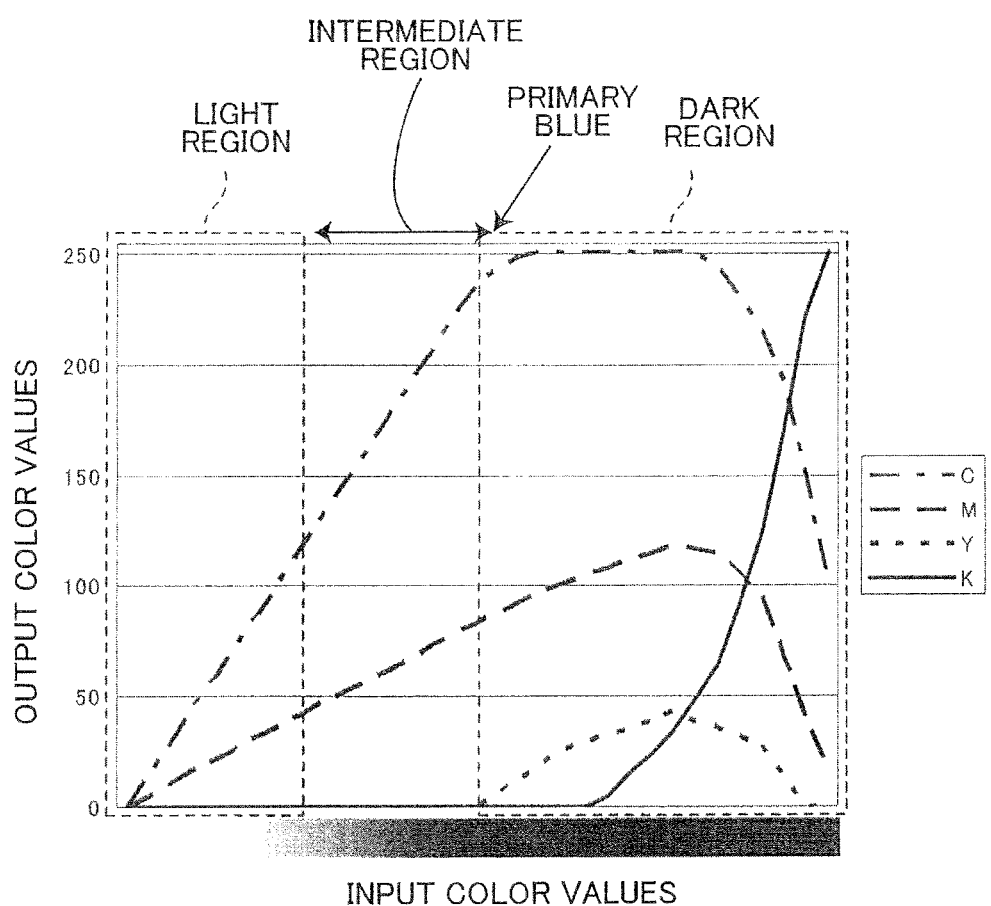
FIG. 4 is a graph showing a relation between the input color values and the output color values in the color profile.

FIG. 3(*a*) shows an example of input color values for the color profile. In this example, the input color values range from white (RGB=255, 255, 255) to blue (RGB=0, 0, 255) and from blue to black (RGB=0, 0, 0). FIG. 3(*b*) is an example of output color values in the color profile. Here, the output color values correspond to the input color values in FIG. 3(*a*). For example, the output color values (CMYK values) for blue corresponding to the input color values for blue (RGB=0, 0, 255) are CMYK=237, 83, 0, 0. As shown in the graph of FIG. 4, the color progression arrives at blue with a density of 100% just before the Y and K components are added. In the following description, the "dark region" refers to the range of densities greater than blue at 100% (primary blue), while the "light region" refers to the density range from 0 to 50% blue. The range of colors between 50 and 100% blue will be referred to as the "intermediate region".

The personal computer 1 according to the embodiment is provided with three different color profiles for various types of objects (photos, text, and graphics). Specifically, a photo color profile is provided for photo objects, a text color profile for text objects, and a graphics color profile for graphics objects.

After undergoing the color conversion process, the image data is then subjected to a correction process based on a correction table, as shown in FIG. 2(*a*). The correction table in the embodiment is a look-up table specifying correlations between input values configured of CMYK values, and output values configured of corrected CMYK values (denoted as C'M'Y'K' values in FIG. 2(*a*) to distinguish them from the input values). Therefore, the corrected image data is also expressed in 256-level CMYK values.

Following the correction process, the image data is further subjected to a thresholding process using the dither method to generate binary image data for each of the CMYK colors. The personal computer 1 then transmits this binary image data to the printer 2, and the printer 2 prints the image represented by this binary image data.

A correction table to be used in the correction process is created when the calibration process is performed. However, prior to performing the calibration process, a default correction table is used. In other words, the correction table used in the correction process is updated each time the calibration process is performed.

In the embodiment, the control unit 11 compares the correction table newly created in each calibration process (hereinafter referred to as the "updated correction table") to the default correction table and determines whether the quantity of toner usage in the updated correction table is greater than that in the default correction table for each color of toner, as shown in FIG. 2(*b*). When the control unit 11 of the personal computer 1 determines that the quantity of toner usage in the updated correction table has increased from that in the default correction table for toner of one or more colors, the control unit 11 of the personal computer 1 adjusts one or more color profiles to reduce the output values for colors whose toner usage has increased.

1-3. Detailed Description of the Processes

Figure 5A:
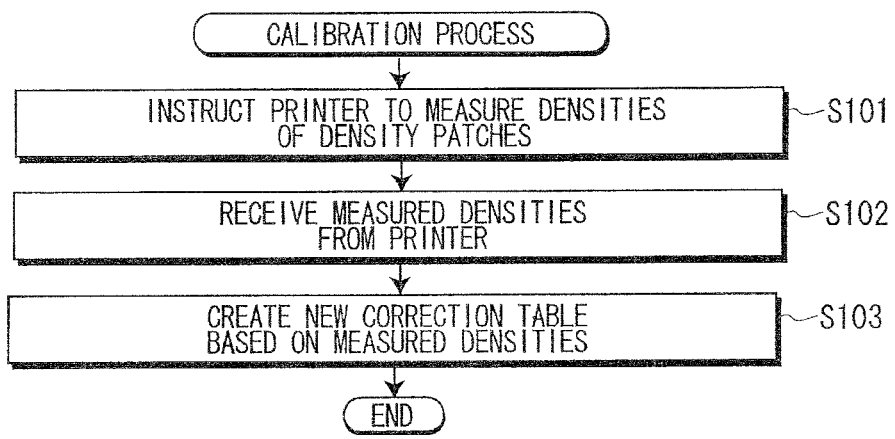
FIG. 5(a) is a flowchart illustrating the calibration process according to the first embodiment.

Next, the calibration process executed by the control unit 11 of the personal computer 1 (and more specifically the CPU 111 of the control unit 11) will be described with reference to the flowchart in FIG. 5(*a*). The control unit 11 executes the calibration process as a function of the printer driver 153 in response to a user request.

In S101 at the beginning of the calibration process, the control unit 11 instructs the printer 2 to measure the densities of density patches. Accordingly, the printer 2 directly forms density patches on the conveying belt with toner used for printing and measures the densities of the density patches with the density sensor 27. Here, the density patches represent a plurality of density levels for each of the CMYK colors.

In S102 the control unit 11 receives measured densities for the density patches from the printer 2. In S103 the control unit 11 creates a new correction table (updated correction table) based on the measured densities and subsequently ends the calibration process. The new correction table is created such that the printer 2 can maintain consistent quality in printed imaged even when the performance of the printer 2 changes over time.

Figure 5B:
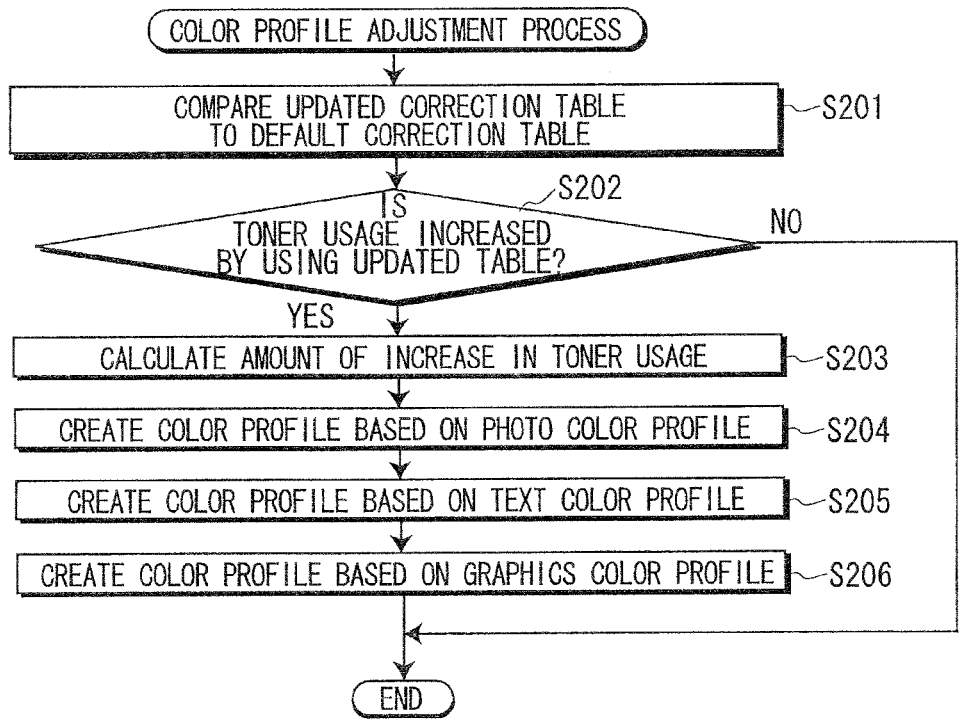
FIG. 5(b) is a flowchart illustrating a color profile adjustment process according to the first embodiment.

Next, a color profile adjustment process executed by the control unit 11 of the personal computer 1 (and more specifically the CPU 111 of the control unit 11) will be described with reference to the flowchart in FIG. 5(b). The control unit 11 executes this color profile adjustment process after the calibration process described in FIG. 5(a).

In S201 at the beginning of the color profile adjustment process, the control unit 11 compares the updated correction table to the default correction table, and in S202 determines for each color of toner whether the toner usage in the updated correction table is higher (greater in density) than that in the default correction table. Specifically, the control unit 11 compares the sum of the correction values (output values) for all input values in the updated correction table to the sum of the correction values (output values) for all input values in the default correction table for each color of toner, and determines that toner usage in the updated correction table has increased over that in the default correction table when there exists at least one color for which the sum of correction values in the updated correction table is greater than the sum of correction values in the default correction table.

If the control unit 11 determines in S202 that toner usage in the updated correction table has increased over that in the default correction table, then in S203 the control unit 11 calculates the amount of increase (difference) in toner usage for colors whose sum of correction values in the updated correction table exceeds the sum of correction values in the default correction table.

This difference may be calculated, for example, as the sum of differences obtained by subtracting values resulting from performing the correction process on output values in the color profile according to the default correction table from values produced in the correction process on these output values in the color profile according to the updated correction table. FIG. 3(c) shows the values produced in a correction process on the output color values in FIG. 3(b) using the default correction table, while FIG. 3(d) shows the values obtained from the correction process performed on the output color values in FIG. 3(b) according to the updated correction table. FIG. 3(e) shows the differences obtained by subtracting the values in FIG. 3(c) from the values in FIG. 3(d). In this example, the sum of differences for the CMYK colors is found to be 64, 64, 28, and 22, respectively.

In S204 the control unit 11 newly creates a modified photo color profile based on the original photo color profile by adjusting the output color values in the dark region of the original photo color profile so that the sum of output color values in the modified photo color profile for each color is equal to a value obtained by subtracting the sum of the differences for that color calculated in S203 from the sum of the output values in the original photo color profile for that color.

FIG. 3(f) shows the modified output color values obtained by reducing the output color values overall in the dark region so that the sum of output color values for each of the CMYK colors in the modified photo color profile is equal to a value obtained by subtracting the sum of the differences for that color shown in FIG. 3(e) from the sum of the output values for that color shown in FIG. 3(b). FIG. 3(g) shows the values obtained by performing a correction process on the output color values in FIG. 3(f) according to the updated correction table. FIG. 3(h) shows the differences obtained by subtracting the values in FIG. 3(c) from the values in FIG. 3(g). Here, the sum of the differences is "0" for each of the CMYK colors. In other words, the increase in the CMYK values in the updated correction table is canceled by reducing the output color values in the color profile.

In the embodiment, the output color values in the dark region for each color shown in FIG. 3(g) is obtained by subtracting a constant value ("4" for C' values, for example) from the output color values in the dark region shown in FIG. 3(d).

In S205 the control unit 11 creates a modified text color profile based on the original text color profile by adjusting output color values in regions other than the light region of the text color profile (the region of densities greater than 50%; i.e., the intermediate region and the dark region) so that the sum of output color values for each color in the modified text color profile is equal to a value obtained by subtracting the sum of the differences for that color calculated in S203 from the sum of output color values for that color in the original text color profile. The details of this process are essentially the same as the process described in S204 for the photo color profile, except that output color values in the intermediate region are modified (reduced) in addition to the dark region. Note that the output color values in the light region depicting text are not modified because reducing the output color values in this region could make the light text so light as to be illegible.

In S206 the control unit 11 creates a modified graphics color profile based on the original graphics color profile by adjusting all output color values in the graphics color profile so that the sum of output color values for each color in the modified graphics color profile is equal to a value obtained by subtracting the sum of the difference for that color calculated in S203 from the sum of output color values for that color in the original graphics color profile. The details of the process to adjust the graphics color profile are similar to those for the photo color profile described in S204, except that the control unit 11 adjusts all output color values in the graphics color profile. Subsequently, the control unit 11 ends the color profile adjustment process.

However, if the control unit 11 determines in S202 that toner usage in the updated correction table has not increased over that in the default correction table (S202: NO), the control unit 11 ends the color profile adjustment process without adjusting color profiles.

Figure 6:
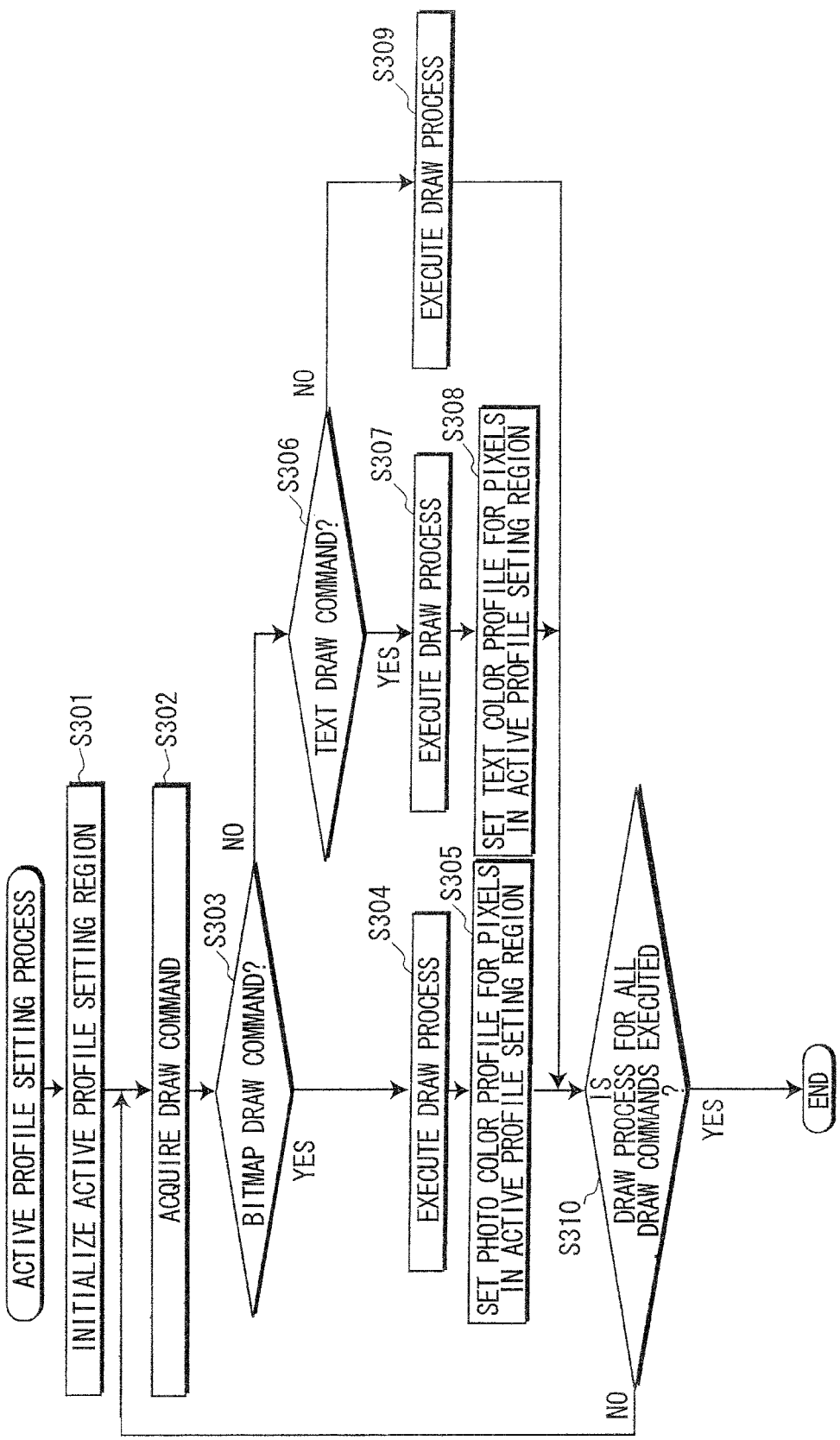
FIG. 6 is a flowchart illustrating an active profile setting process according to the first embodiment.

Next, an active profile setting process executed by the control unit 11 of the personal computer 1 (and specifically the CPU 111 of the control unit 11) will be described with reference to the flowchart in FIG. 6. The control unit 11 executes the active profile setting process as a function of the printer driver 153 when the user has initiated a print operation for printing image represented by the image data in the application program 152.

In S301 at the beginning of the active profile setting process, the personal computer 1 initializes an active profile setting region. The active profile setting region is an area of the RAM 113 allocated for storing profile flags indicating the type of color profile to be used in a color conversion process (hereinafter referred to as the "active profile") for each pixel in the image to be printed. Specifically, in S301 the control unit 11 initializes the profile flags to "0" for all pixels in the active profile setting region. In subsequent processes (S305 and S308), the control unit 11 sets profiles flags to "1" for pixels whose active profile is the photo color profile, and "2" whose active profile is the text color profile. The profile flag is left unchanged at "0" for pixels whose active profile is the graphics color profile.

Figure 7B:
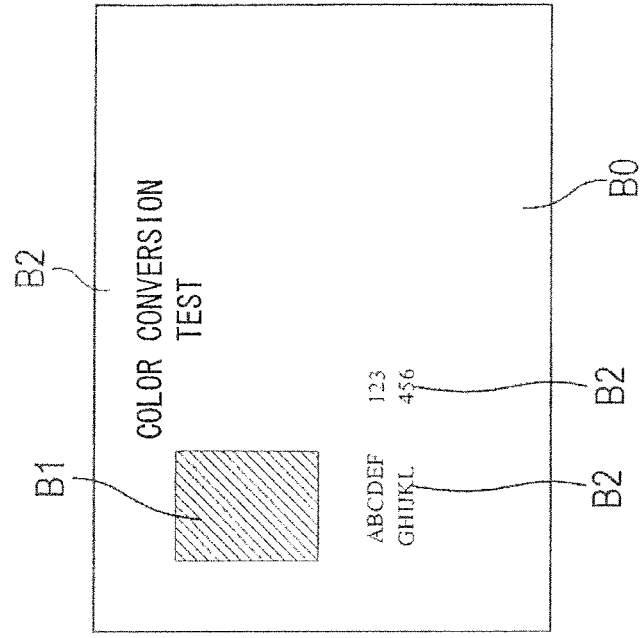
FIG. 7(b) is a conceptual diagram showing an active profile setting region.
Figure 7A:
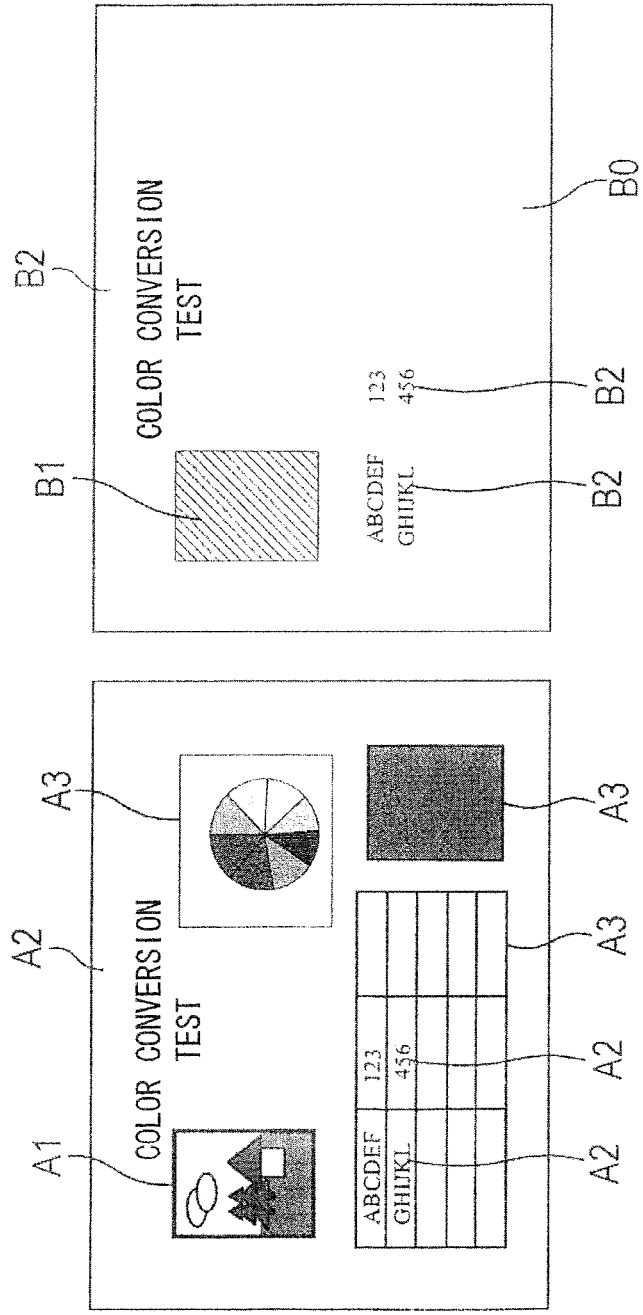
FIG. 7(a) is an explanatory diagram illustrating an image to be printed.

FIG. 7(a) shows a sample image to be printed. As shown in FIG. 7(a), the image includes a photo object A1, text objects A2, and graphics objects A3. FIG. 7(b) is a conceptual drawing showing the active profile setting region storing profile flags for the image in FIG. 7(a). In FIG. 7(b), each pixel in a region B0 depicted in white has been initialized to "0", each pixel in a region B1 has the profile flag "1" indicating a photo color profile, and each pixel in regions B2 depicted in black has been set to the profile flag "2" indicating a text color profile.

Returning to FIG. 6, in S302 the control unit 11 acquires one draw command that has not yet been subjected to one of the draw processes in S304, S307, and S309 described below. The draw command is acquired from all draw commands constituting the image data representing the image to be printed and set as the process target. That is, each draw command corresponds to one object. When objects in the image to be printed are arranged in overlapping positions, the control unit 11 acquires draw commands in overlapping positions in order with the command for the topmost object being last. Consequently, the active profile for areas with overlapping objects is set based on the draw command of the topmost object at each overlapping position.

In S303 the control unit 11 determines whether the draw command acquired in S302 as the process target is a bitmap draw command (photo draw command). That is, the control unit 11 determines whether the object of the process target is the bitmap. If the control unit 11 determines that the process target is a bitmap draw command (S303: YES), in S304 the control unit 11 executes the draw process based on the draw command. Through this process, the process target is developed into 256-level RGB data representing the photo object.

In S305 the control unit 11 sets the profile flag to "1" indicating the photo color profile for all pixels in the active profile setting region that correspond to the drawing region for the RGB data generated in S304. In other words, the control unit 11 sets the active profile for all pixels constituting the photo object developed in S304 to the photo color profile. Subsequently, the control unit 11 advances to S310.

However, if the control unit 11 determines in S303 that the process target is not a bitmap draw command (S303: NO), in S306 the control unit 11 determines whether the process target is a text draw command. That is, the control unit 11 determines whether object of the process target is text. If the control unit 11 determines that the process target is a text draw command (S306: YES), in S307 the control unit 11 executes a draw process based on the process target. That is, if the process target is graphics draw command (i.e. the object of the process target is the graphics), the profile flags is left unchanged at "0". Through this draw process, the process target is developed into 256-level RGB data representing the text object.

In S308 the control unit 11 sets the profile flag to "2" indicating the text color profile for all pixels in the active profile setting region that correspond to the drawing region for the RGB data generated in S307. In other words, the active profile for all pixels constituting the text object developed in S307 is set to the text color profile. Subsequently, the control unit 11 advances to S310.

However, if the control unit 11 determines in S306 that the process target is not a text draw command (i.e., that the process target is a graphics draw command; S306: NO), in S309 the control unit 11 executes a draw process based on the process target. Through this draw process, the process target is developed into 256-level RGB data representing a graphics object. Subsequently, the control unit 11 advances to S310.

In S310 the control unit 11 determines whether the draw process has been executed for all draw commands in the image data representing the image to be printed. The control unit 11 returns to S302 upon determining that there remain draw commands for which the draw process has not yet been executed (S310: NO) and ends the active profile setting process upon determining that the draw process has been executed for all draw commands (S310: YES).

Next, a binary image data generation process executed by the control unit 11 of the personal computer 1 (and more specifically, the CPU 111 of the control unit 11) will be described with reference to the flowchart in FIG. 8. The control unit 11 executes the binary image data generation process after completing the active profile setting process in FIG. 6 as a function of the printer driver 153.

In S401 at the beginning of the binary image data generation process, the control unit 11 acquires pixel data (256-level RGB values) for one pixel that has yet to be subjected to a thresholding process described later (S409) from the pixels in the image to be printed.

In S402 the control unit 11 acquires the active profile from the active profile setting region that has been set for the pixel data acquired in S401. In S403 the control unit 11 determines whether the active profile acquired in S402 is the photo color profile.

When the control unit 11 determines that the active profile is the photo color profile (S403: YES), in S404 the control unit 11 executes the color conversion process using the photo color profile. If the control unit 11 creates the modified photo color profile in the color profile adjustment process shown in FIG. 5(b), the control unit executes the color conversion process using the modified photo color profile. If the modified photo color profile was not created, the control unit 11 uses the original photo color profile. Subsequently, the control unit 11 advances to S408 described below.

However, if the control unit 11 determines that the active profile is not the photo color profile (S403: NO), in S405 the control unit 11 determines whether the active profile acquired in S402 is the text color profile.

If the control unit 11 determines that the active profile is the text color profile (S405: YES), in S406 the control unit 11 executes the color conversion process using the text color profile. If the control unit 11 creates the modified text color profile in the color profile adjustment process shown in FIG. 5(b), the control unit executes the color conversion process using the modified text color profile. If the modified text color profile was not created, the control unit 11 uses the original text color profile. Subsequently, the control unit 11 advances to S408 described below.

However, if the control unit 11 determines that the active profile is not the text color profile (i.e., that the active profile is the graphics color profile; S405: NO), in S407 the control unit 11 executes the color conversion process using the graphics color profile. If the control unit 11 creates the modified graphics color profile in the color profile adjustment process shown in FIG. 5(b), the control unit executes the color conversion process using the modified graphics color profile. If the modified photo color profile was not created, the control unit 11 uses the original graphics color profile. Subsequently, the control unit 11 advances to S408.

In S408 the control unit 11 performs the correction process to correct the CMYK values produced from the color conversion process based on the correction table. In S409 the control unit 11 executes the thresholding process for converting the 256-level CMYK values produced from the correction process into binary values (2-level values).

In S410 the control unit 11 determines whether the thresholding process has been executed for all pixels in the image to be printed. The control unit 11 returns to S401 upon determining that there remain pixels that have not been subjected to the thresholding process (S410: NO) and ends the binary image data generation process upon determining that all pixels have been subjected to the thresholding process (S410: YES).

1-4. Effects of the Embodiment

According to the first embodiment described above, the personal computer 1 can reduce the levels of toner used through the color conversion process by adjusting the color profiles so as to reduce output color values when the toner usage in the updated correction table is greater than that in the default correction table. As a result, the personal computer 1 can neutralize the increase in toner usage so that the printer 2 is less likely to run out of toner before the actual number of printed sheets reaches the number of printable sheets estimated based on the default correction table.

By adjusting the photo color profile to reduce output color values in the dark region in particular, the personal computer 1 can reduce toner usage without a likely drop in the quality of printed photo objects. Color balance and gradation levels are extremely important for photo objects, and changes in toner usage in light and intermediate regions can upset the CMYK color balance. However, since the dark region contains near-black colors, reducing output color values in the dark region does not dramatically change the color tones, despite there being a slight shift in the color balance.

Further, the personal computer 1 according to the embodiment adjusts the text color profile to reduce output color values in regions other than the light region. Accordingly, the personal computer 1 can reduce the quantity of toner usage while preventing light text from becoming so light as to be illegible.

Further, the personal computer 1 according to the embodiment adjusts the graphics color profile to reduce all output color values. Hence, the personal computer 1 can prevent a drop in quality in the printed images.

In addition, by making an overall determination as to whether the toner usage in the updated correction table is greater than that in the default correction table without regard for the image being printed, the personal computer 1 can reduce the process load required for this determination.

2. Second Embodiment

2-1. Differences from the First Embodiment

Next, a second embodiment of the invention will be described. The second embodiment has the same basic configuration as the first embodiment, but differs in the following points.

(1) The personal computer 1 according to the second embodiment determines whether toner usage in the updated correction table has increased over toner usage in the default correction table by comparing the sums of CMYK values for all pixels obtained when correcting the image data representing the image to be printed based on the default correction table to the sums of CMYK values for all pixels obtained when correcting the image data based on the updated correction table for each of the toner colors. In other words, the personal computer 1 determines whether toner usage in the updated correction table is greater than that in the default correction table based on the image to be printed.

(2) The personal computer 1 according to the second embodiment calculates the differences obtained by subtracting the sum of CMYK values for all pixels obtained when correcting the image data based on the updated correction table from the sum of CMYK values for all pixels obtained when correcting the image data based on the default correction table for each of the toner colors. These differences are accumulated for each color of toner as the total surplus (as described later in S513) each time the image is printed.

(3) The personal computer 1 according to the second embodiment determines whether the quantity of toner usage in the updated correction table has increased over the quantity of toner usage in the default correction table for one or more colors. When this amount of increase, which is the amount of excessive usage, exceeds the total surplus calculated above, the personal computer 1 adjusts the color profile to reduce the output color values (CMYK values) for the colors whose toner usage has increased.

Figure 2C:
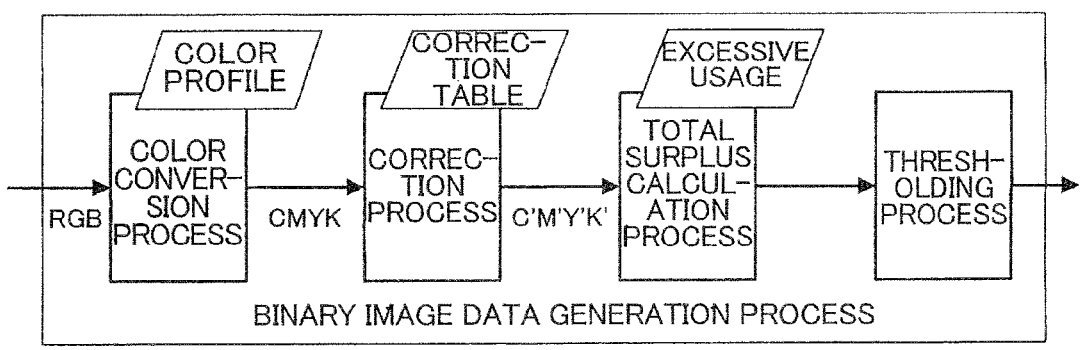
FIG. 2(c) is an explanatory diagram illustrating a binary image data generation process according to a second embodiment.

Specifically, as shown in FIG. 2(c), the personal computer 1 according to the second embodiment calculates the total surplus of toner based on image data produced in the correction process. If the excessive usage is less than or equal to the total surplus, the personal computer 1 does not adjust the color profile, even though the toner usage in the updated correction table is greater than that in the default correction table. Hence, rather than performing the color profile adjustment process in FIG. 5(b), the active profile setting process in FIG. 6, and the binary image data generation process in FIG. 8 described in the first embodiment, the personal computer 1 according to the second embodiment performs a binary image data generation process shown in FIG. 9 and an excessive toner usage calculation process shown in FIG. 10. The remaining configuration of the second embodiment is identical to that in the first embodiment and will not be described below.

2-2. Detailed Description of the Processes

Next, the binary image data generation process executed by the control unit 11 of the personal computer 1 (and more specifically, the CPU 111 of the control unit 11) will be described with reference to the flowchart in FIG. 9. The control unit 11 executes the binary image data generation process as a function of the printer driver 153 in response to a print operation for printing the represented by the image data initiated by the user. The binary image data generation process is performed after the control unit 11 executes a draw process for image data including draw commands in the drawing region.

Figure 10:
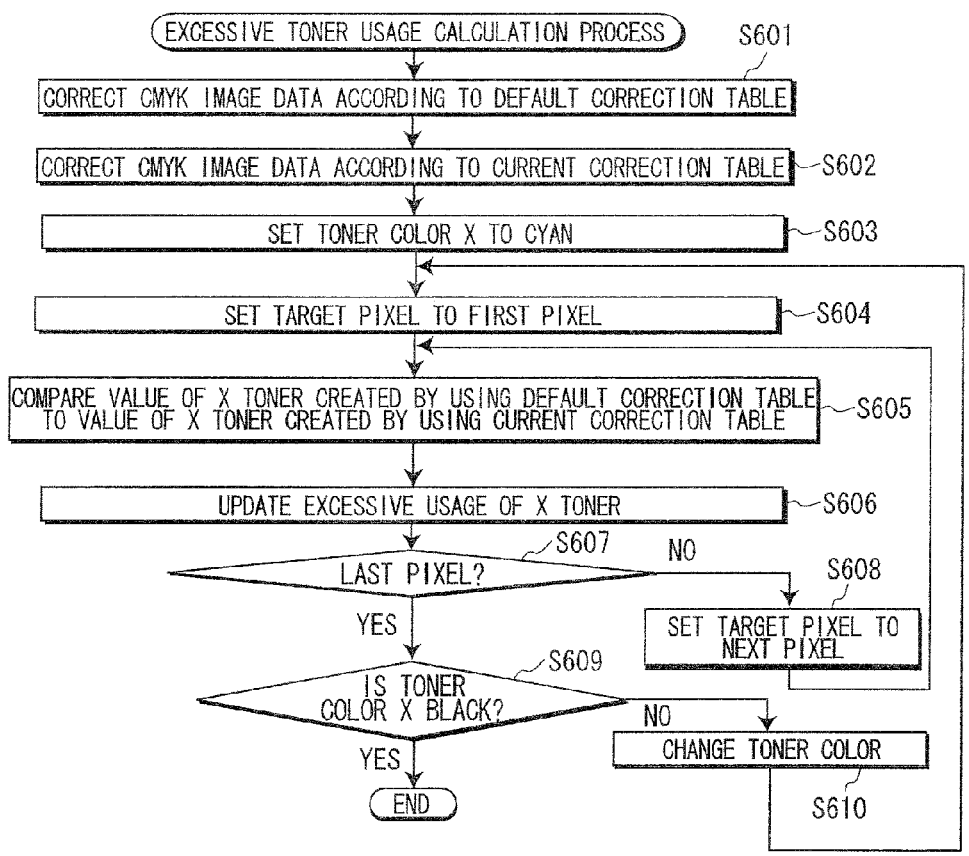
FIG. 10 is a flowchart illustrating an excessive toner usage calculation process according to the second embodiment.

In S501 at the beginning of the binary image data generation process, the control unit 11 executes the color conversion process using a normal color profile. In S502 the control unit 11 executes an excessive toner usage calculation process. FIG. 10 is a flowchart illustrating steps in the excessive toner usage calculation process. In S601 of the process in FIG. 10, the control unit 11 corrects the CMYK image data according to the default correction table.

In S602 the control unit 11 corrects the CMYK image data based on the current correction table. The "current correction table" is the default correction table before the calibration process has been executed once and is the updated correction table after the calibration process has been executed once.

In S603 the control unit 11 sets a target toner color X to cyan (C). Here, X is a variable representing one of the colors C, M, Y, and K. In the following description, X will be treated as the color set as the process target.

In S604 the control unit 11 sets a target pixel (i.e., a pixel to be processed) to the first pixel in the image (the pixel in the upper left, for example). In S605 the control unit 11 compares the value of X toner in the image data created in S601 (hereinafter referred to as the "default correction value") to the value of X toner in the image data created in S602 (hereinafter referred to as the "current correction value") for the target pixel and calculates the difference between the two values (i.e., current correction value—default correction value).

In S606 the control unit 11 updates the excessive usage of X toner by adding the difference calculated in S605 to the quantity of excessive usage for X toner accumulated thus far and temporarily stored in the RAM 113. Hence, the control unit 11 adds up the difference calculated for each target pixel in order to find the sum of differences for all pixels in the image, and sets this sum as the excessive usage. The control unit 11 updates the excessive usage in the RAM 113 such that the excessive usage indicates this sum.

In S607 the control unit 11 determines whether the target pixel is the last pixel in the image (the pixel on the bottom right, for example). If the control unit 11 determines that the target pixel is not the last pixel of the image (S607: NO), in S608 the control unit 11 sets the target pixel to the next pixel after the current target pixel, and subsequently returns to S605.

However, if the control unit 11 determines that the target pixel is the last pixel (S607: YES), in S609 the control unit 11 determines whether the toner color X currently being processed is black (K). If the control unit 11 determines that the toner color X is not black (S609: NO), in S610 the control unit 11 changes the toner color set as X to another color. Specifically, if the toner color X is currently cyan, the control unit 11 changes the process target to magenta. If the toner color X is currently magenta, the control unit 11 changes the process target to yellow. If the toner color X is currently yellow, the control unit 11 changes the process target to black. Subsequently, the control unit 11 returns to S604.

However, if the control unit 11 determines in S609 that the process target of the toner color X is black (i.e., that all of the CMYK colors have been processed; S609: YES), the control unit 11 ends the excessive toner usage calculation process. Through the excessive toner usage calculation process described above, the control unit 11 calculates excessive toner usage (amount of increase in toner usage) for each of the CMYK colors.

In S606 the difference (current correction value—default correction value) for the target pixel is added to the excessive usage for each toner color X. After the control unit 11 finishes the excessive toner usage calculation process that repeats S605 and S606 shown in FIG. 10, the excessive usage for each color indicates a difference of a sum of the current correction value for all pixels and a sum of the default correction value for all pixels for each of CMYK colors.

Figure 9:
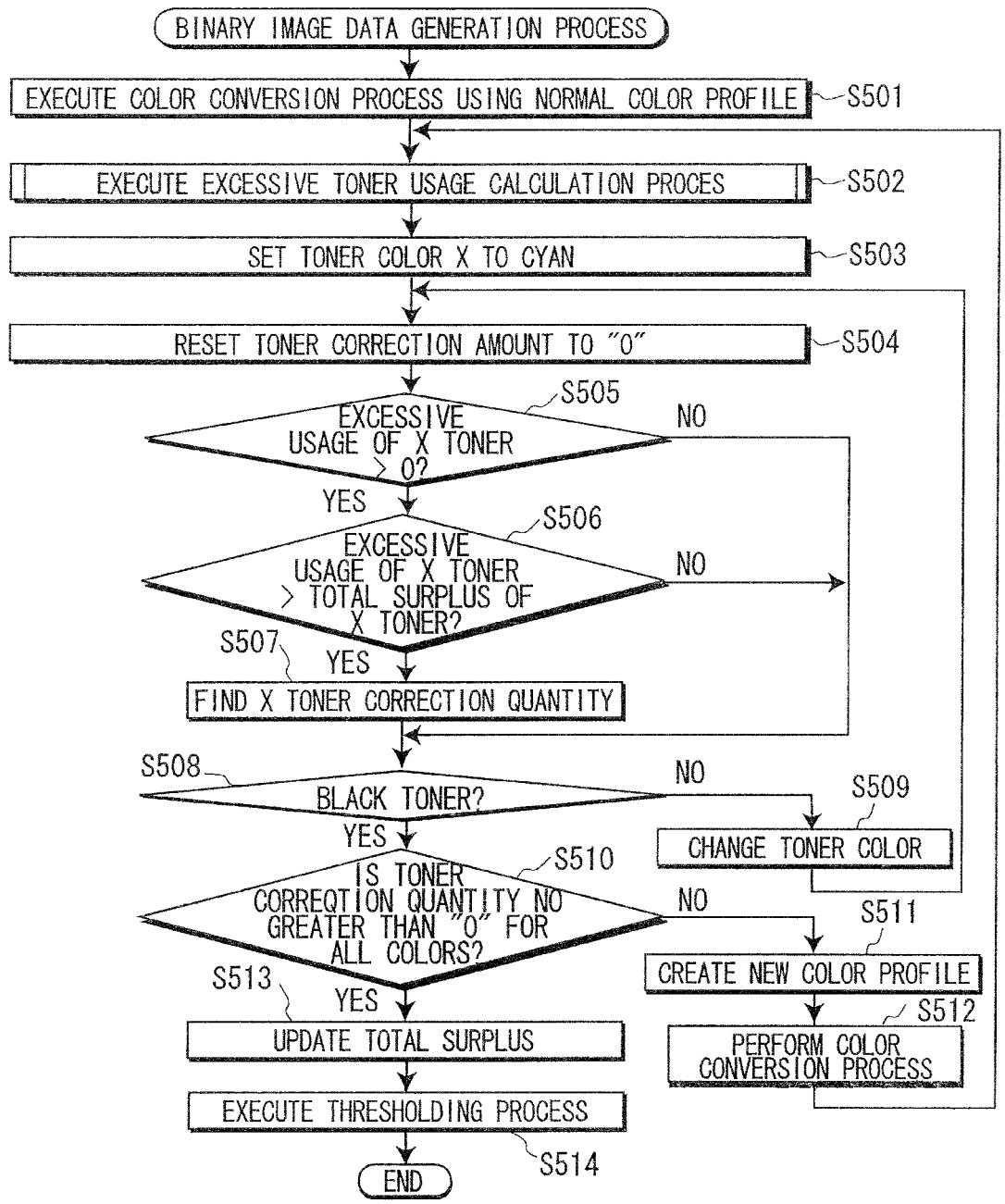
FIG. 9 is a flowchart illustrating the binary image data generation process according to the second embodiment.

Returning to the flowchart in FIG. 9, in S503 the control unit 11 sets the toner color X to the process target cyan. In S504 the control unit 11 resets the X toner correction amount to "0". In S505 the control unit 11 determines whether the excessive usage of X toner calculated in S502 is greater than "0". In other words, the control unit 11 determines whether the amount of toner usage in the current correction table has increased over that in the default correction table.

When the control unit 11 determines in S505 that the excessive usage of X toner is greater than "0" (S505: YES), in S506 the control unit 11 determines whether the excessive usage of X toner is greater than the total surplus of X toner. If the control unit 11 determines that the excessive usage of X toner is greater than the total surplus of X toner (S506: YES), in S507 the control unit 11 finds the X toner correction quantity by subtracting the total surplus of X toner from the excessive usage of X toner. In other words, the control unit 11 sets the correction quantity to the portion of the excessive usage not counterbalanced by the total surplus. Subsequently, the control unit 11 advances to S508.

However, if the control unit 11 determines in S505 that the excessive usage of X toner is less than or equal to "0" (S505: NO) or if the control unit 11 determines in S506 that the excessive usage of X toner is less than or equal to the total surplus of X toner (S506: NO), then the control unit 11 advances directly to S508 while leaving the correction quantity for X toner at "0".

In S508 the control unit 11 determines whether the current process target of the toner color X is black. If the toner color X is not black (S508: NO), in S509 the control unit 11 changes the process target for the toner color X. That is, if the toner color X is currently cyan, the control unit 11 changes the process target to magenta. If the toner color X is currently magenta, the control unit 11 changes the process target to yellow. If the toner color X is currently yellow, the control unit 11 changes the process target to black. Subsequently, the control unit 11 returns to S504.

However, if the control unit 11 determines in S505 that the process target of toner color X is black (i.e., that the above process has been performed for all CMYK colors; S508: YES), in S510 the control unit 11 determines whether the toner correction quantity is no greater than "0" for all four CMYK colors.

If the control unit 11 determines that one or more toner colors have a correction quantity greater than "0" (S510: NO), in S511 the control unit 11 creates a color profile that reduces the toner usage for each color by the toner correction quantity of the corresponding color. The same method described in the first embodiment may be used to correct the color profile. For example, the control unit 11 may adjust all output color values so that the sum of output color values for each color is reduced an amount equivalent to the toner correction quantity. As described in the first embodiment, the control unit 11 may perform separate processes based on the type of object.

In S512 the control unit 11 performs the color conversion process using the new color profile created in S511. Subsequently, the control unit 11 returns to S502 and repeats the process described above from S502 using the adjusted color profile.

However, if the control unit 11 determines in S510 that the toner correction quantity for each of the four CMYK colors is "0" or less (S510: YES), in S513 the control unit 11 updates the total surplus by subtracting the excessive usage from the current total surplus for toner in each of the CMYK colors. Note that the total surplus is increased when the excessive usage is smaller than "0". The excessive usage for each color indicated the difference of the sum of the current correction value for all pixels and the sum of the default correction value for all pixels. Thus, the total surplus indicates the accumulation of the negative value of the excessive usage. The total surplus resets to a prescribed initial value when a new toner (a toner cartridge (not shown), for example) is mounted.

In S514 the control unit 11 executes a thresholding process for converting image data produced in the correction process based on the current correction table in S602 to binary values. Subsequently, the control unit 11 ends the binary image data generation process.

2-3. Effects of the Second Embodiment

As described above, the personal computer 1 according to the second embodiment can make a relatively more accurate determination regarding whether toner usage in the updated correction table has increased over that in the default correction table since the personal computer 1 makes this determination for each printing operation using the image data representing the image being printed.

Moreover, the personal computer 1 according to the second embodiment does not adjust the color profile unless the excessive usage of toner has exceeded the total surplus, even when the toner usage in the updated correction table has increased over that in the default correction table. Hence, this method prevents the personal computer 1 from unnecessarily restricting toner usage when extra toner was left over from a previous printing operation.

3. Variations of the Embodiments

While the invention has been described in detail with reference to specific embodiments thereof, it would be apparent to those skilled in the art that many modifications and variations may be made therein without departing from the scope of the invention, the scope of which is defined by the attached claims.

(A) The personal computer 1 according to the first embodiment described above uses a photo color profile for photo objects, a text color profile for text objects, and a graphics color profile for graphics objects, but the invention is not limited to this configuration. For example, the personal computer 1 may share the same color profile for both text and graphics objects so that overall output color values in text objects are also adjusted, as with the graphics color profile.

(B) In the embodiments described above, the printer 2 forms density patches on the conveying belt used for conveying the printing media. However, if the printer 2 is configured to transfer toner images temporarily from the photosensitive members to an intermediate transfer belt and subsequently to transfer the full color image from the intermediate transfer belt to the printing medium, the printer 2 may form the density patches on the intermediate transfer belt. Alternatively, the printer 2 may form density patches on the printing medium.

(C) Although toner is used as an example of colorant (color material) in the embodiments, the colorant of the invention is not limited to toner, but may instead be ink, for example.

(D) While the process according to the invention is performed by the personal computer 1 in the embodiments, this process may be performed on the printer 2 side instead, for example.

What is claimed is:

1. An image processing device comprising:
a processor; and
a memory having instructions stored thereon that, when executed by the processor, cause the device to perform a process in which the device:
acquires image data indicating an image and having an input value, the image data to be printed by using at least one color material;
converts the input value to an output value by using a color profile that correlates the input value to the output value, the output value specifying an amount of a color material of the at least one color material;
corrects the output value to a corrected value by using a correction table that correlates the output value to the corrected value;
updates the correction table based on a density patch formed by using the at least one color material;
determines for each color material of the at least one color material whether a first amount is greater than a second amount, the first amount being an estimated amount of the each color material to be consumed when corrected image data corrected by using the updated correction table is printed, the second amount being an estimated amount of the each color material to be consumed when corrected image data corrected by using an initial correction table that is not updated is printed; and
modifies the color profile when the device determines that the first amount is greater than the second amount for one color material of the at least one color material,
wherein the image data includes a plurality of input values,
wherein the color profile correlates the plurality of input values to a plurality of output values,
wherein the correction table correlates the plurality of output values to a plurality of corrected values,
wherein the device determines for each color material of the at least one color material whether the first amount is greater than the second amount by comparing a first sum with a second sum, the first sum indicating a sum of the corrected values of the updated correction table that correspond to all the input values in the image data when all the input values in the image data are converted to output values by using the unmodified color profile, the second sum indicating a sum of the corrected values of the initial correction table that correspond to all the input values in the image data when all the input values in the image data are converted to output values by using the unmodified color profile,
wherein when the device determines that the first sum is greater than the second sum, the device modifies the color profile such that the output value in the modified color profile specifies a less amount of color material corresponding to the one color material than an amount of color material specified by the output value in the unmodified color profile corresponding to the one color material and such that a third sum becomes equal to the second sum, the third sum being based on a sum of the corrected values of the updated corrected table that correspond to all the input values in the image data when all the input values are converted to output values by using the modified color profile.

2. The image processing device according to claim 1, wherein the image data includes an object that specifies the input value,
wherein the device determines whether the object is categorized as a photo object,
converts the input value that is specified by the object categorized as the photo object by using a first color profile to the output value, and converts the input value that is specified by the object that is not categorized as the photo object by using a second color profile different from the first color profile to the output value,
wherein the output value represents a density between a light region and a dark region,
wherein the device modifies the first color profile such that the output value representing the density in a dark region in the first color profile is modified to a modified output value specifying a less amount of color material than an amount of color material specified by the output value in the unmodified first color profile.

3. The image processing device according to claim 2, wherein the device modifies the second color profile such that the output value representing any density in the second color profile is modified to the modified output value specifying a less amount of color material than an amount of color material specified by the output value in the unmodified second color profile.

4. The image processing device according to claim 1, wherein the device determines for each color material of the at least one color material whether the first amount is greater than the second amount by comparing the corrected value in the updated correction table with the corrected value in the initial correction table.

5. The image processing device according to claim 1, wherein the device obtains a surplus amount by accumulating a first difference calculated by subtracting the first sum from the second sum for each color material each time the image data is printed, and modifies the color profile such that the output value in the modified color profile specifies a less amount of color material corresponding to the one color material than an amount of color material specified by the output value in the unmodified color profile corresponding to the one color material, when the device determines that the first amount is greater than the second amount for one color of the at least one color material, and when a second difference calculated by subtracting the second sum from the first sum is greater than the surplus amount.

6. A non-transitory computer readable storage medium storing a set of program instructions installed on and executed by a computer to perform a color calibration process, the program instructions comprising:

acquiring image data indicating an image and having an input value, the image data being printed by using at least one color material;

converting the input value to an output value by using a color profile that correlates the input value to the output value, the output value specifying an amount of a color material of the at least one color material;

correcting the output value to a corrected value by using a correction table that correlates the output value to the corrected value;

updating the correction table based on a density patch formed by using the at least one color material;

determining for each color material of the at least one color material whether a first amount is greater than a second amount, the first amount being an estimated amount of the each color material to be consumed when corrected image data corrected by using the updated correction table is printed, the second amount being an estimated amount of the each color material to be consumed when corrected image data corrected by using an initial correction table that is not updated is printed; and modifying the color profile, when the determining determines that the first amount is greater than the second amount for one color material of the at least one color material wherein the image data includes a plurality of input values, wherein the color profile correlates the plurality of input values to a plurality of output values, wherein the correction table correlates the plurality of output values to a plurality of corrected values, wherein the determining determines for each color material of the at least one color material whether the first amount is greater than the second amount by comparing a first sum with a second sum, the first sum indicating a sum of the corrected values of the updated correction table that correspond to all the input values in the image data when all the input values in the image data are converted to output values by using the unmodified color profile, the second sum indicating a sum of the corrected values of the initial correction table that correspond to all the input values in the image data when all the input values in the image data are converted to output values by using the unmodified color profile, wherein when the determining determines that the first sum is greater than the second sum, the modifying modifies the color profile such that the output value in the modified color profile specifies a less amount of color material corresponding to the one color material than an amount of color material specified by the output value in the unmodified color profile corresponding to the one color material and such that a third sum becomes equal to the second sum, the third sum being based on a sum of the corrected values of the updated corrected table that correspond to all the input values in the image data when all the input values are converted to output values by using the modified color profile.

7. The image processing device according to claim 1, wherein the input value is expressed by RGB color space, and the output value and the corrected value are expressed by CMYK color space, wherein the color profile correlates the input value expressed by the RGB color space to the output value expressed by the CMYK color space, wherein the correction table correlates the output value expressed by CMYK color space to the corrected value expressed by CMYK color space.

8. The image processing device according to claim 1, wherein the device generates print data by using the plurality of corrected values, wherein the device acquires first image data and second image data, as the image data, wherein when the device generate print data based on the first image data, the device:

calculates a first difference by subtracting the second sum obtained by using the first image data and the first sum obtained by using the first image data;

determines for each color material of the at least one color material whether the first amount for the first image data is greater than the second amount for the first image data based on the first difference;

sets a total surplus by subtracting the first sum from the second sum when the device determines that the first amount is smaller than the second amount for each color material of the at least one color material;

generates the print data based on the first image data by using the initial color profile and the updated correction table when the device determines that the first amount is smaller than the second amount for each color material of the at least one color material; and generates print data based on the first image data by using the modified color profile and the updated correction table when the device determines that the first amount is greater than the second amount for one color material of the at least one color material, wherein after the device generates the print data based on the first image data, the device generates print data based on the second image data, wherein when the device generates the print data based on the second image data, the device:

calculates a second difference by subtracting the second sum obtained by using the second image data from the first sum obtained by using the second image data;

determines for each color material of the at least one color material whether the first amount for the second image data is greater than the second amount for the second image data based on the second difference;

determines whether the second difference is greater than the total surplus when the device determines that the first amount is greater than the second amount for one color material of the at least one color material;

modifies the color profile such that the third sum becomes equal to a sum of the total surplus and a value obtained by subtracting the second difference from the first sum obtained by using the second image data, when the second difference is greater than the total surplus, and generates the print data based on the second image data by using the modified color profile and the updated correction table, calculates an updated total surplus by adding, to the total surplus, a value subtracting the first sum obtained by using the second image data from the second sum obtained by using the second image data when the device determines that the first amount is smaller than the second amount for each color material of the at least one color material; and generates the print data based on the second image data by using the initial color profile and the updated correction table when the device determines that the first amount is smaller than the second amount for each color material of the at least one color material.

* * * * *